United States Patent
Toyoda et al.

(10) Patent No.: US 12,423,962 B2
(45) Date of Patent: Sep. 23, 2025

(54) SYSTEM FOR GENERATING IMAGE, AND NON-TRANSITORY COMPUTER-READABLE MEDIUM

(71) Applicant: Hitachi High-Tech Corporation, Tokyo (JP)

(72) Inventors: Yasutaka Toyoda, Tokyo (JP); Masayoshi Ishikawa, Tokyo (JP); Masanori Ouchi, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 322 days.

(21) Appl. No.: 17/781,295

(22) PCT Filed: Jan. 9, 2020

(86) PCT No.: PCT/JP2020/000481
§ 371 (c)(1),
(2) Date: May 31, 2022

(87) PCT Pub. No.: WO2021/140620
PCT Pub. Date: Jul. 15, 2021

(65) Prior Publication Data
US 2022/0415024 A1    Dec. 29, 2022

(51) Int. Cl.
*G06V 10/776* (2022.01)
*G06T 5/50* (2006.01)
(Continued)

(52) U.S. Cl.
CPC .............. *G06V 10/776* (2022.01); *G06T 5/50* (2013.01); *G06T 7/11* (2017.01); *G06V 10/774* (2022.01);
(Continued)

(58) Field of Classification Search
None
See application file for complete search history.

(56) References Cited

U.S. PATENT DOCUMENTS

| 10,789,703 B2 | 9/2020 | Lu et al. |
| 2006/0002635 A1 | 1/2006 | Nestares et al. |

(Continued)

FOREIGN PATENT DOCUMENTS

| JP | 10173029 A | * 6/1998 |
| JP | 2018-77786 A | 5/2018 |

(Continued)

OTHER PUBLICATIONS

International Search Report (PCT/ISA/210) issued in PCT Application No. PCT/JP2020/000481 dated Mar. 24, 2020 with English translation (four (4) pages).
(Continued)

*Primary Examiner* — Delomia L Gilliard
(74) *Attorney, Agent, or Firm* — Crowell & Moring LLP

(57) ABSTRACT

This disclosure relates to a system for performing efficient learning of a specific portion. To achieve this purpose, there is proposed a system configured to generate a converted image on the basis of input of an input image, the system comprising a learning model in which parameters are adjusted so as to suppress an error between the input image and a second image converted upon input of the input image, the learning model being subjected to different learning at least between a first area in the image and a second area different from the first area.

21 Claims, 14 Drawing Sheets

(51) Int. Cl.
  *G06T 7/11* (2017.01)
  *G06V 10/774* (2022.01)
  *G06V 10/98* (2022.01)

(52) U.S. Cl.
  CPC .. *G06V 10/993* (2022.01); *G06T 2207/10061* (2013.01); *G06T 2207/20021* (2013.01); *G06T 2207/20081* (2013.01); *G06T 2207/20084* (2013.01)

(56) References Cited

U.S. PATENT DOCUMENTS

| | | | |
|---|---|---|---|
| 2006/0104540 | A1 | 5/2006 | Haussecker et al. |
| 2007/0019887 | A1 | 1/2007 | Nestares et al. |
| 2018/0137603 | A1 | 5/2018 | Hsiao et al. |
| 2018/0137605 | A1* | 5/2018 | Otsuka ............ G06T 5/70 |
| 2018/0182067 | A1 | 6/2018 | Liu et al. |
| 2018/0240225 | A1 | 8/2018 | Harada et al. |
| 2019/0244399 | A1* | 8/2019 | Li ............ G01R 33/56545 |
| 2019/0287761 | A1* | 9/2019 | Schoenmakers ........ G06T 7/174 |
| 2019/0295225 | A1* | 9/2019 | Saito ............ G06T 5/70 |
| 2019/0295228 | A1 | 9/2019 | Liu et al. |
| 2019/0365341 | A1* | 12/2019 | Chan ............ G06T 7/0012 |
| 2020/0126201 | A1 | 4/2020 | Harada et al. |

FOREIGN PATENT DOCUMENTS

| | | | | | |
|---|---|---|---|---|---|
| JP | 2018077786 | A | * | 5/2018 | ............ G06T 5/002 |
| JP | 2018137275 | A | * | 8/2018 | ............ G06T 5/003 |
| JP | 2019-211475 | A | | 12/2019 | |
| TW | 200608310 | A | | 3/2006 | |
| TW | 201818346 | A | | 5/2018 | |
| TW | 201837458 | A | | 10/2018 | |
| TW | 201946089 | A | | 12/2019 | |

OTHER PUBLICATIONS

Japanese-language Written Opinion (PCT/ISA/237) issued in PCT Application No. PCT/JP2020/000481 dated Mar. 24, 2020 (three (3) pages).

Taiwanese-language Office Action issued in Taiwan Application No. 109139683 dated Sep. 30, 2021 (13 pages).

Taiwanese-language Office Action issued in Taiwan Application No. 109139683 dated Mar. 3, 2022 (15 pages).

Extended European Search Report issued in European Application No. 20911598.9 dated Sep. 22, 2023 (13 pages).

Gao, Z. et al., "Deep Learning for Super-Resolution in a Field Emission Scanning Electron Microscope", AI, Oct. 15, 2019, pp. 1-9, vol. 1, No. 1, MDPI, XP 93079353 (9 pages).

Rad, M. S. et al., "SROBB: Targeted Perceptual Loss for Single Image Super-Resolution", International Conference on Computer Vision (ICCV), Oct. 27, 2019, pp. 2710-2719, IEEE/CVF, XP 033723939 (10 pages).

Korean-language Office Action issued in Korean Application No. 10-2022-7017833 dated Aug. 13, 2024 (6 pages).

* cited by examiner

[FIG. 1]
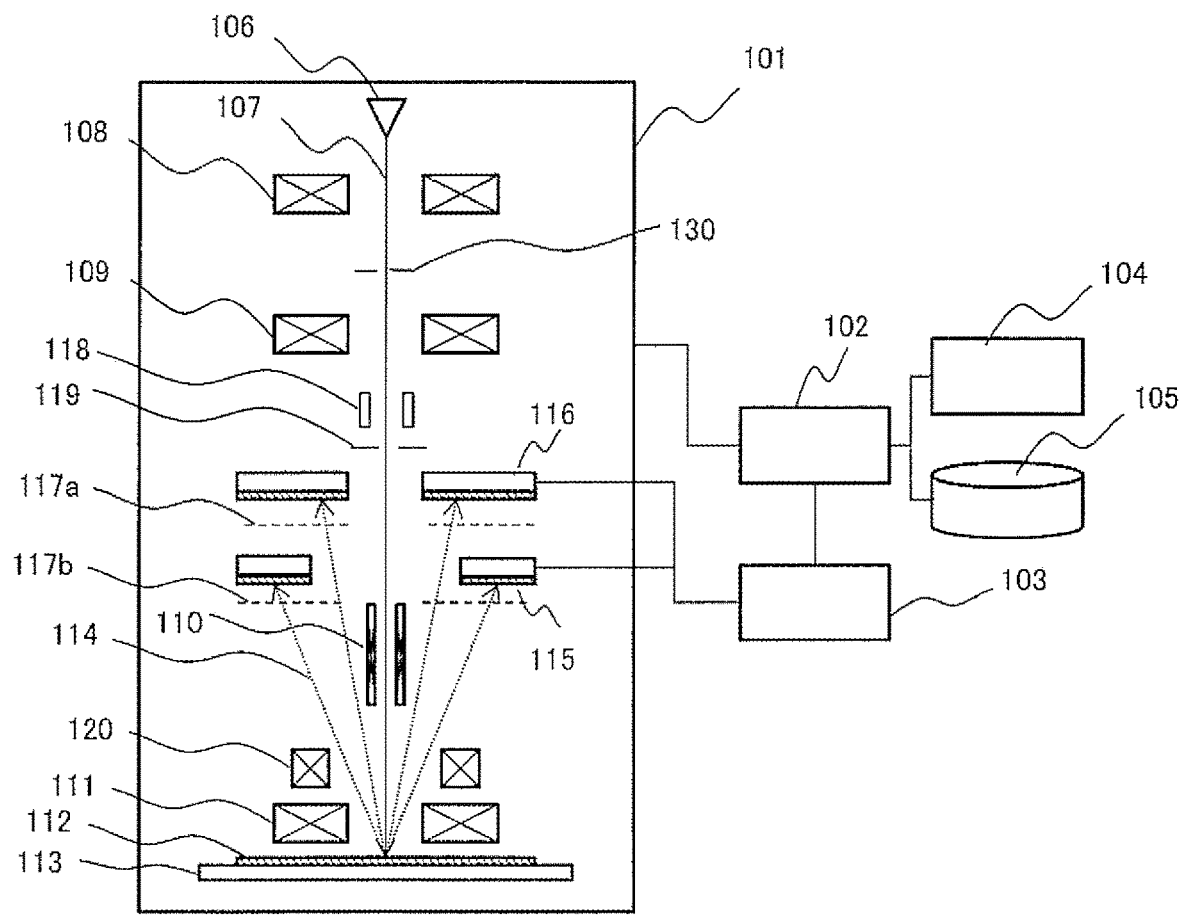

[FIG. 2]
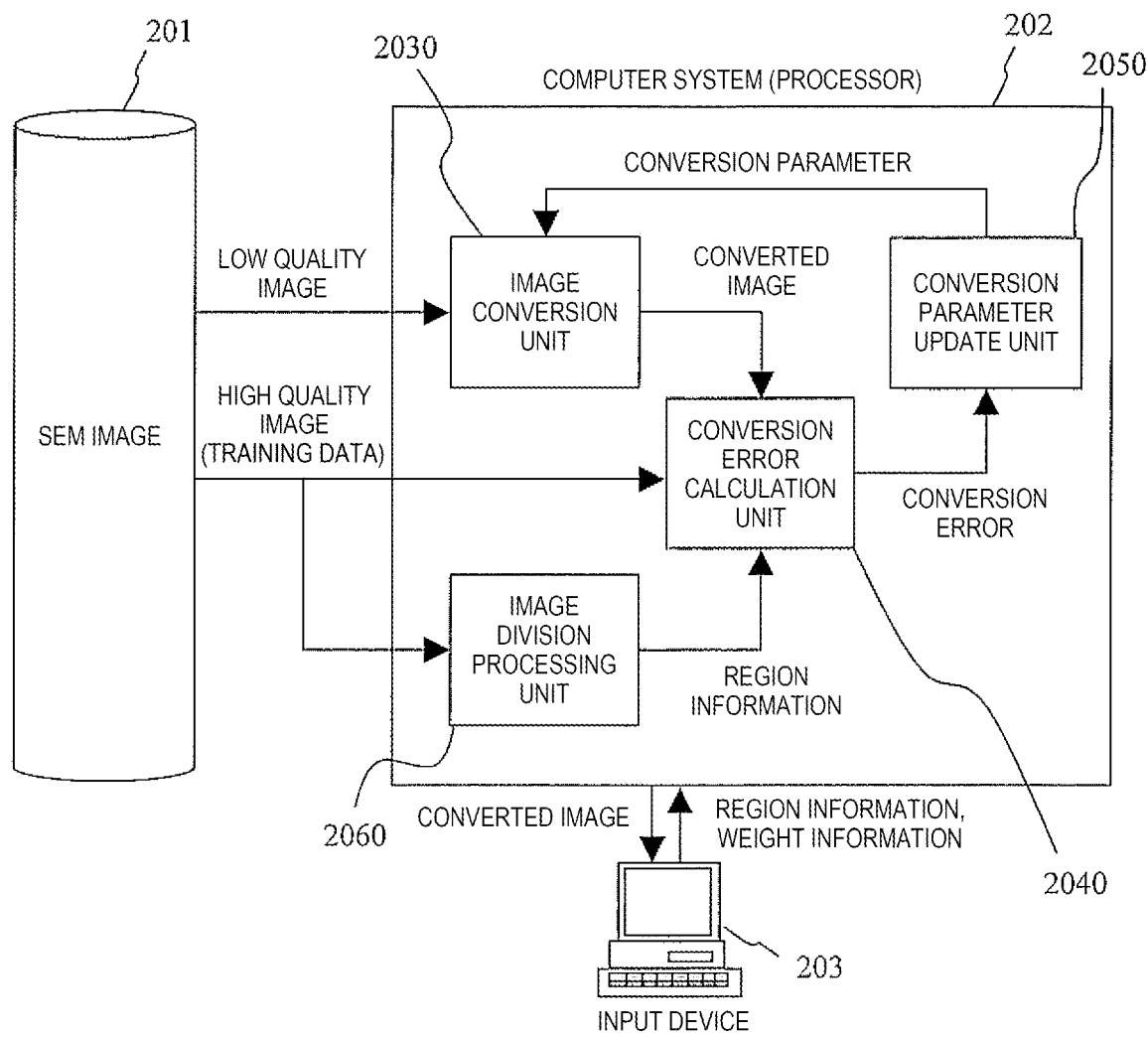

[FIG. 3]
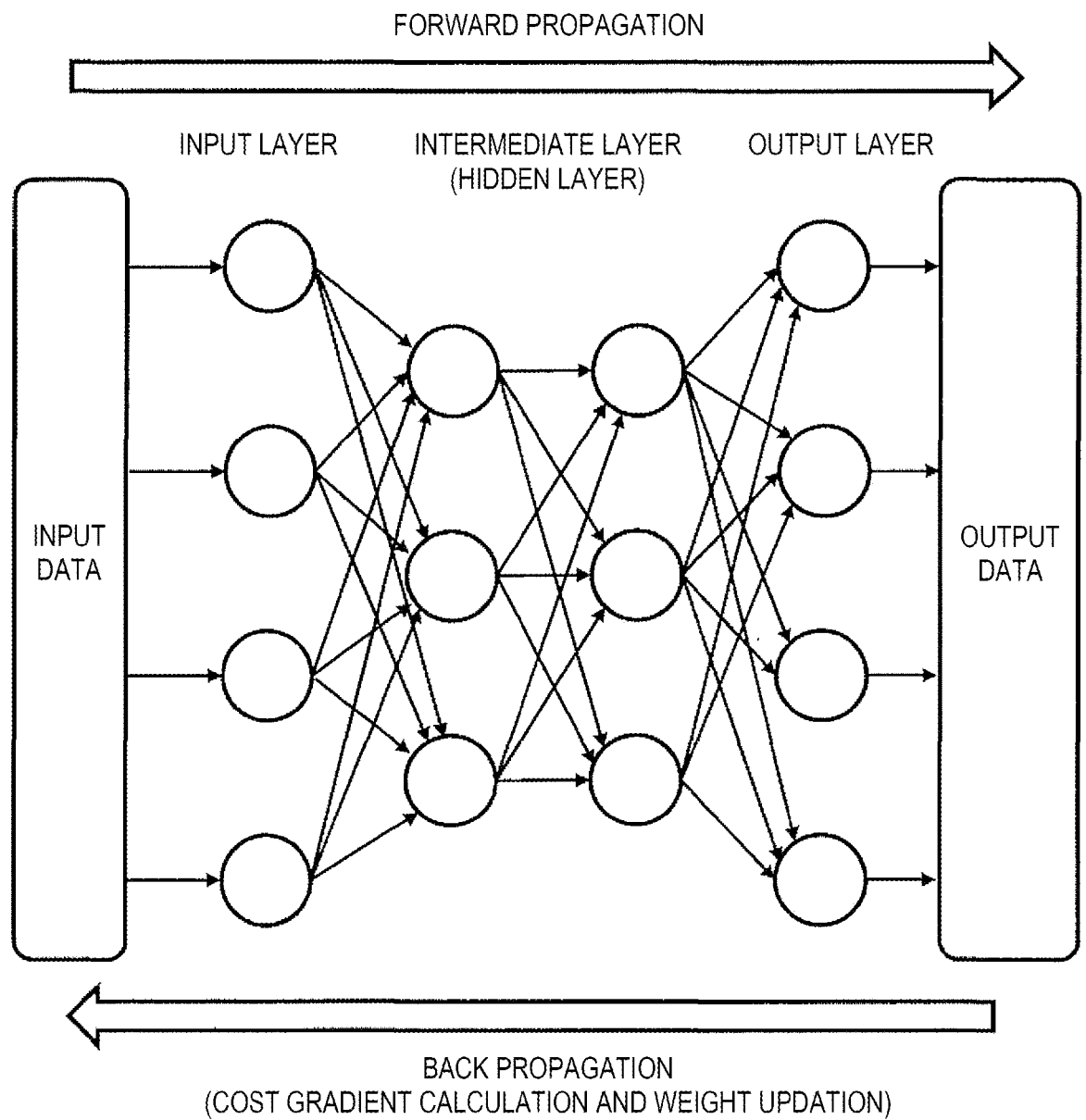

BEAM SCANNING RANGE

[FIG. 5]
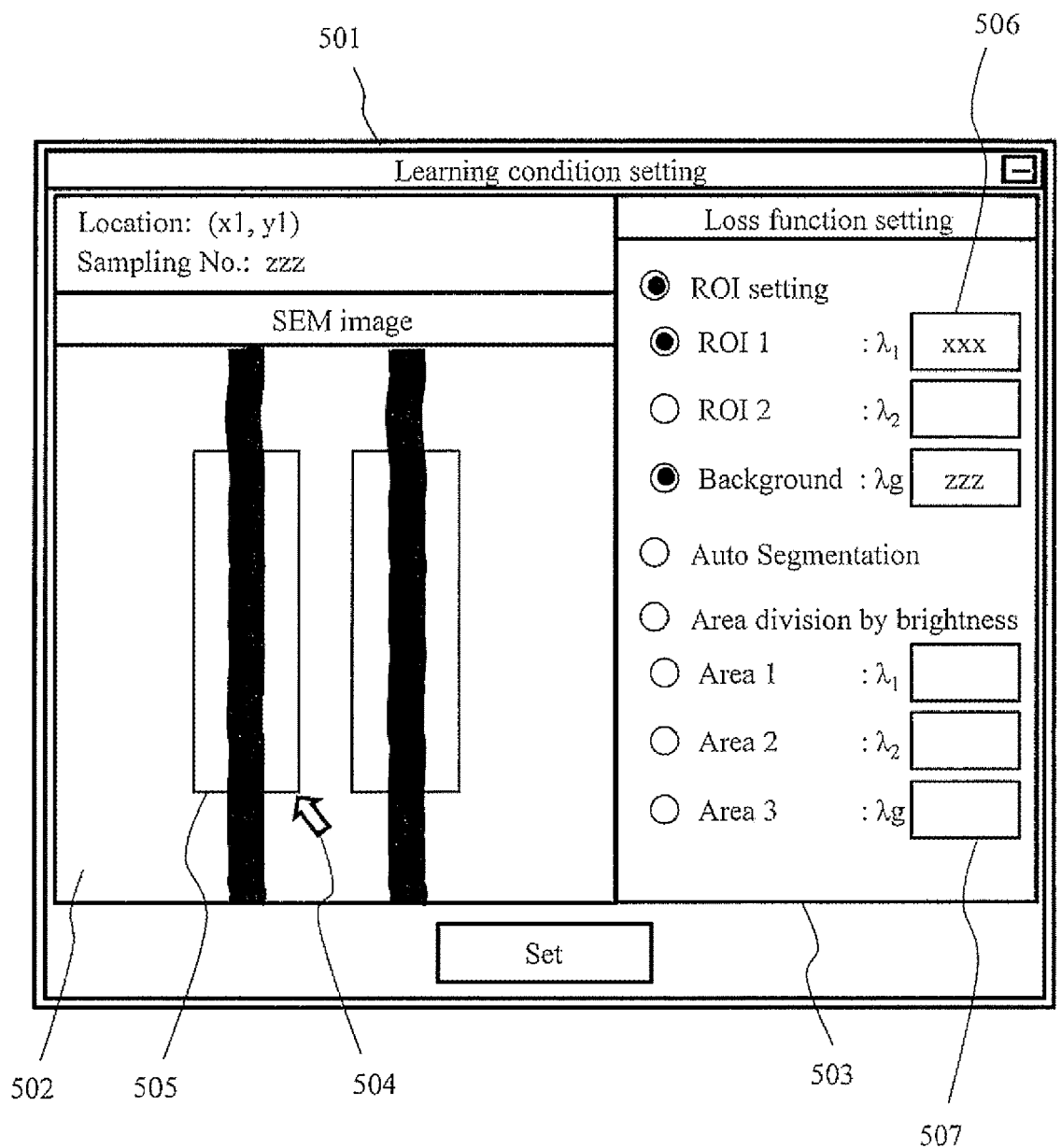

[FIG. 6]
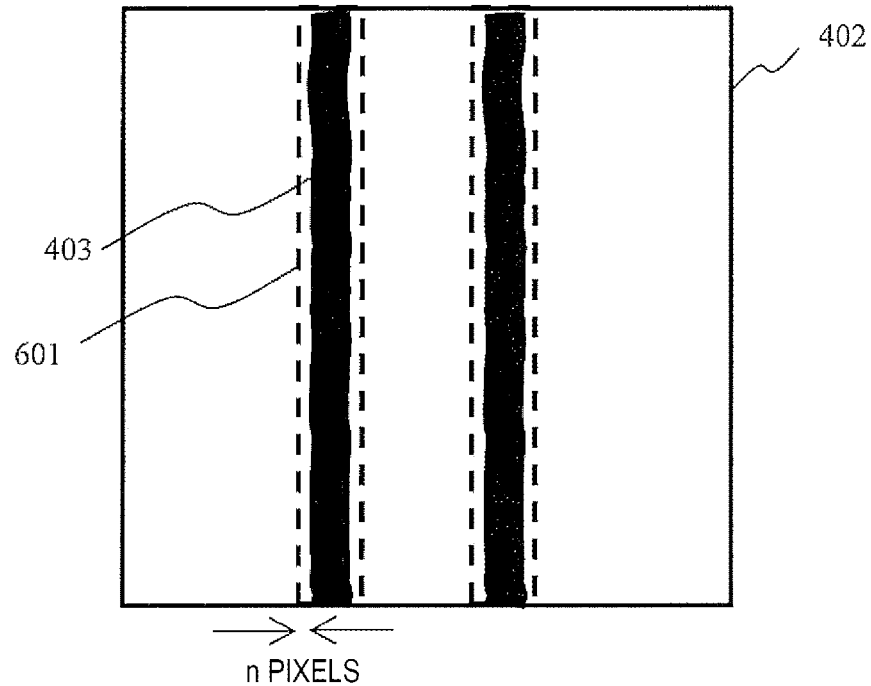
[FIG. 7]
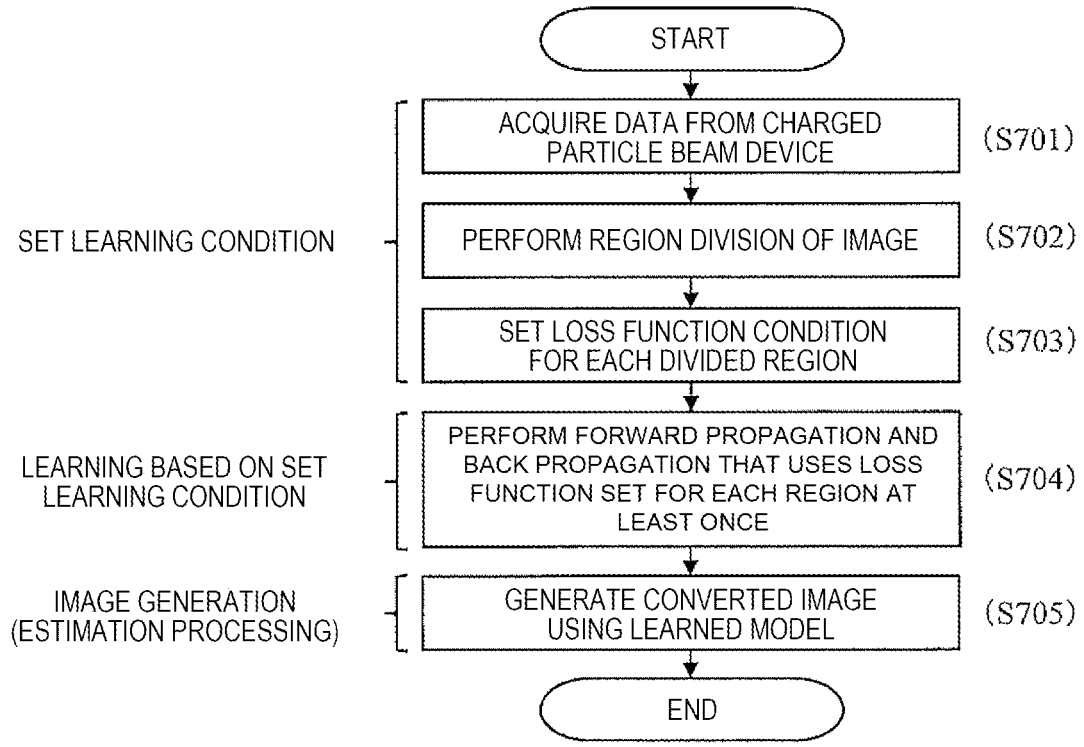

[FIG. 9]
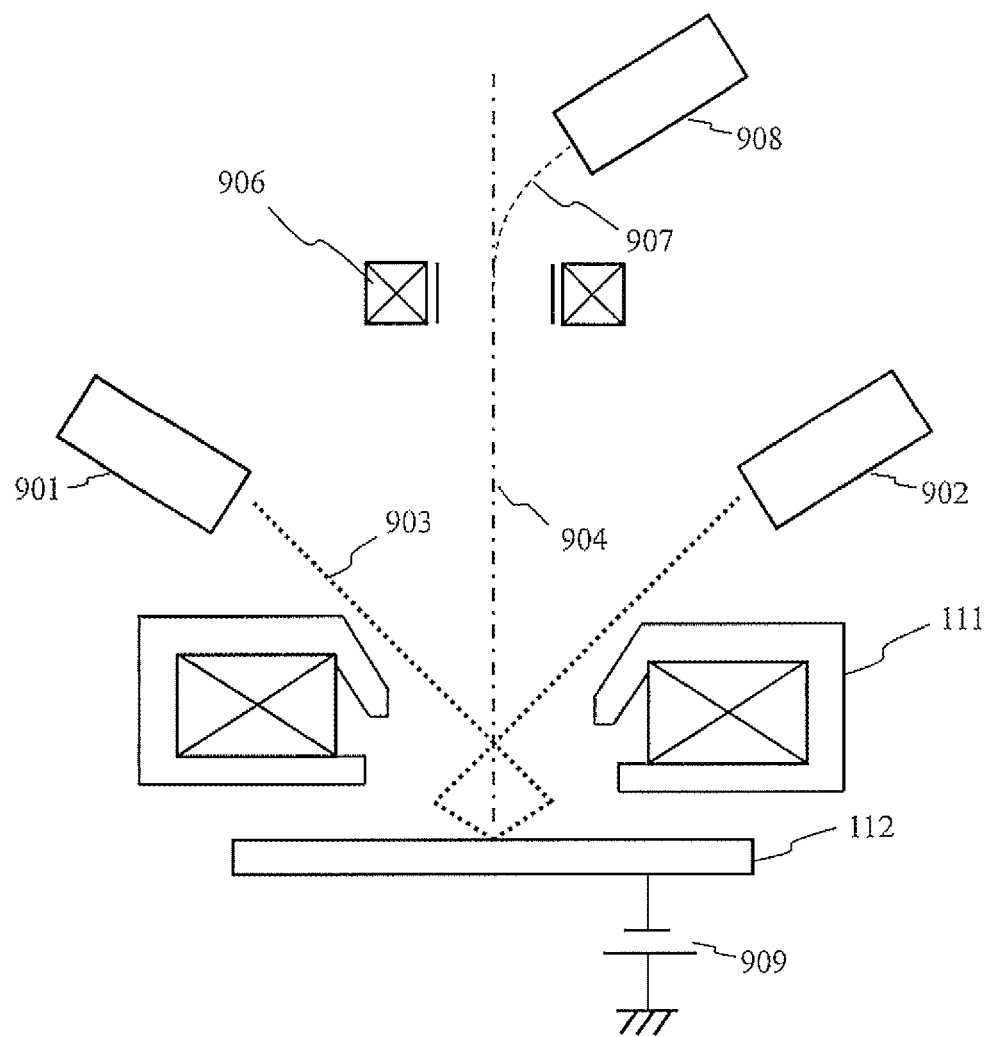

[FIG. 10]
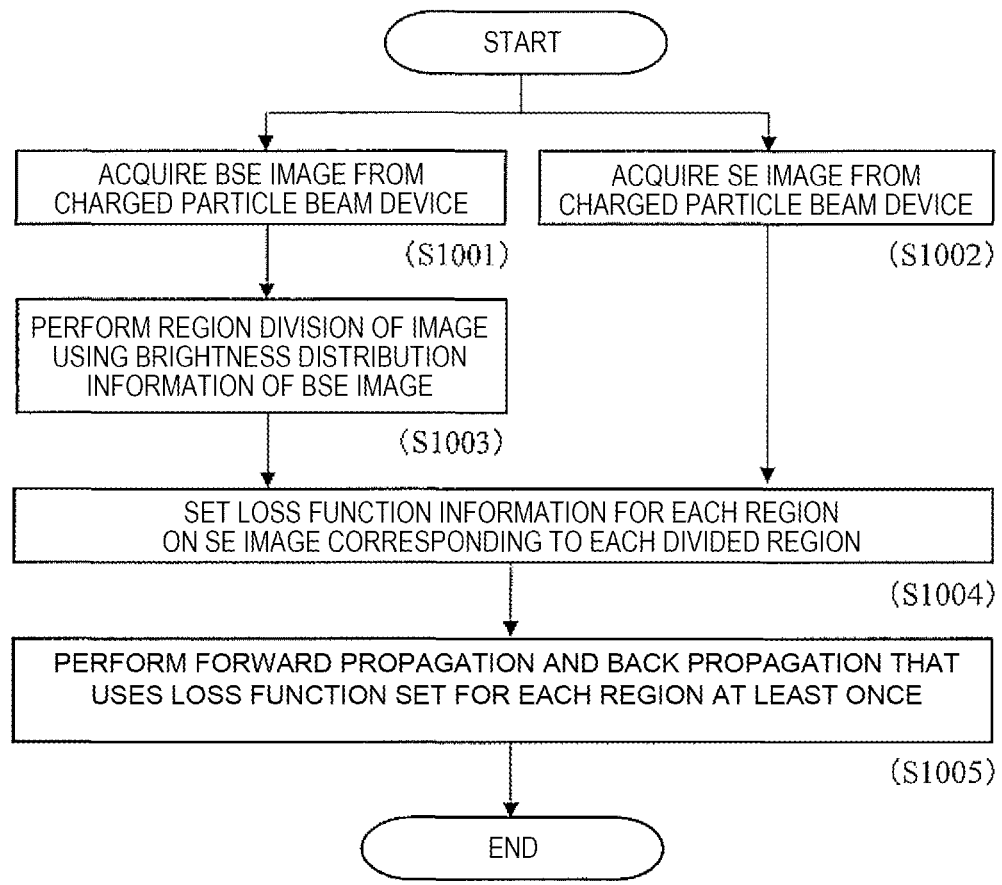

[FIG. 11]
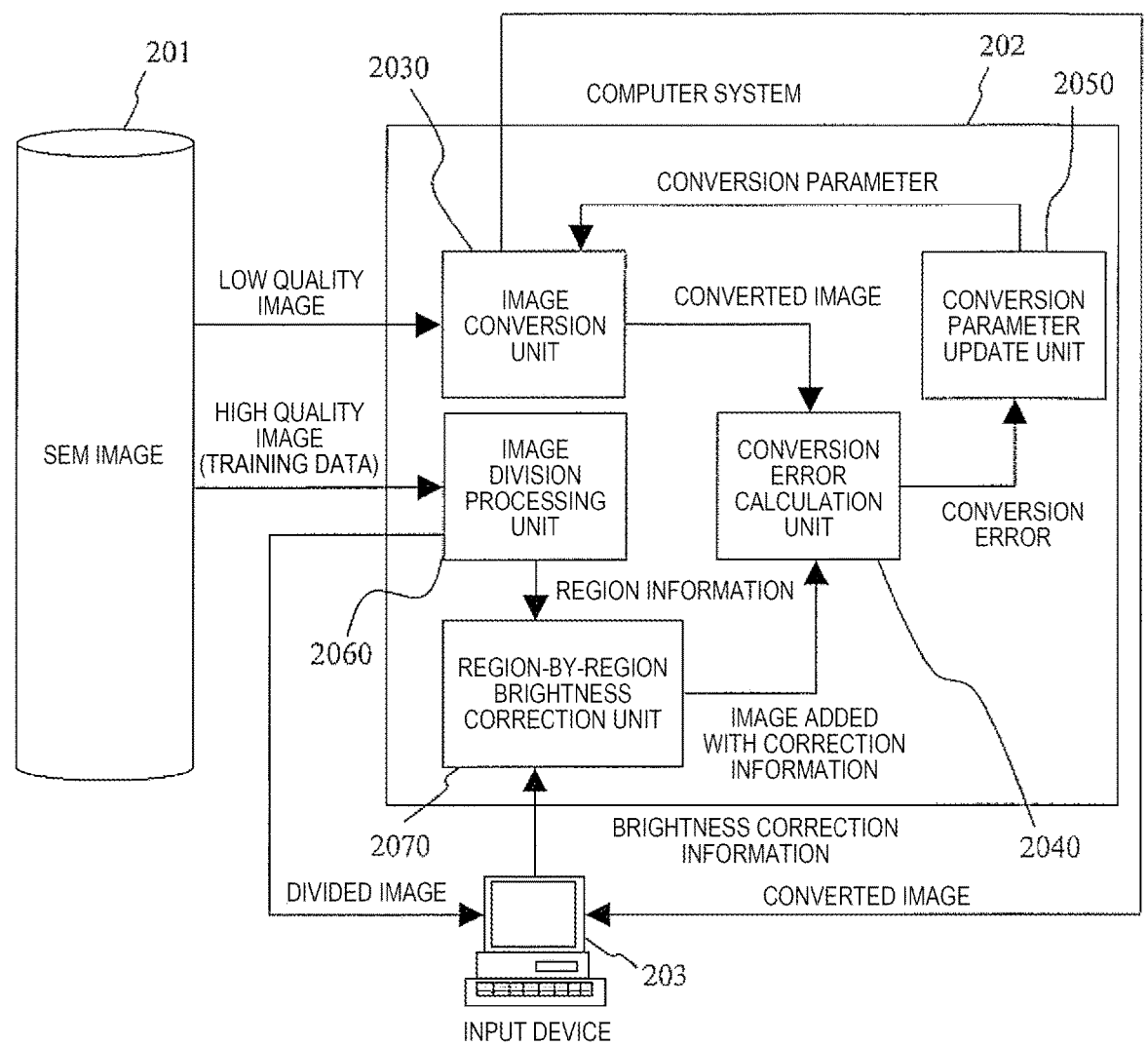

[FIG. 12]
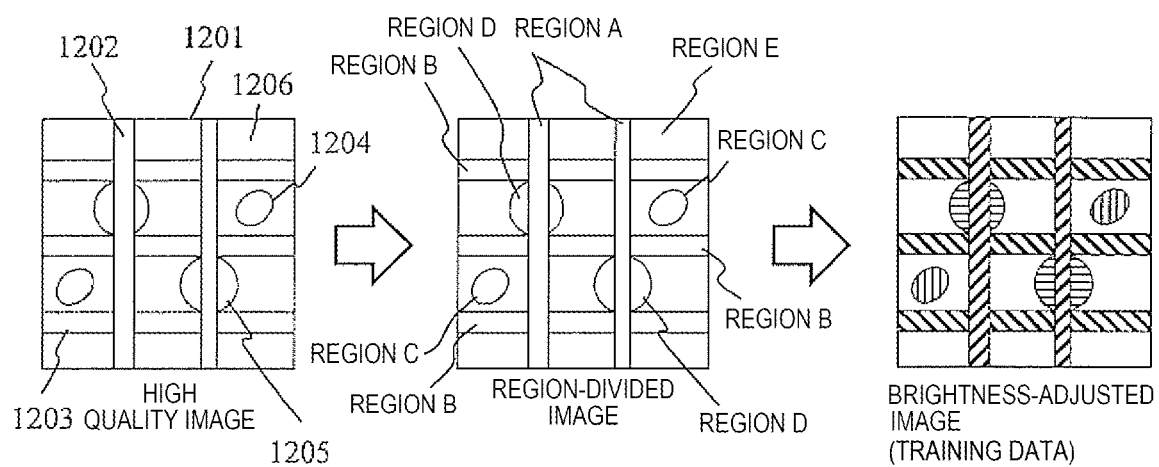

[FIG. 13]
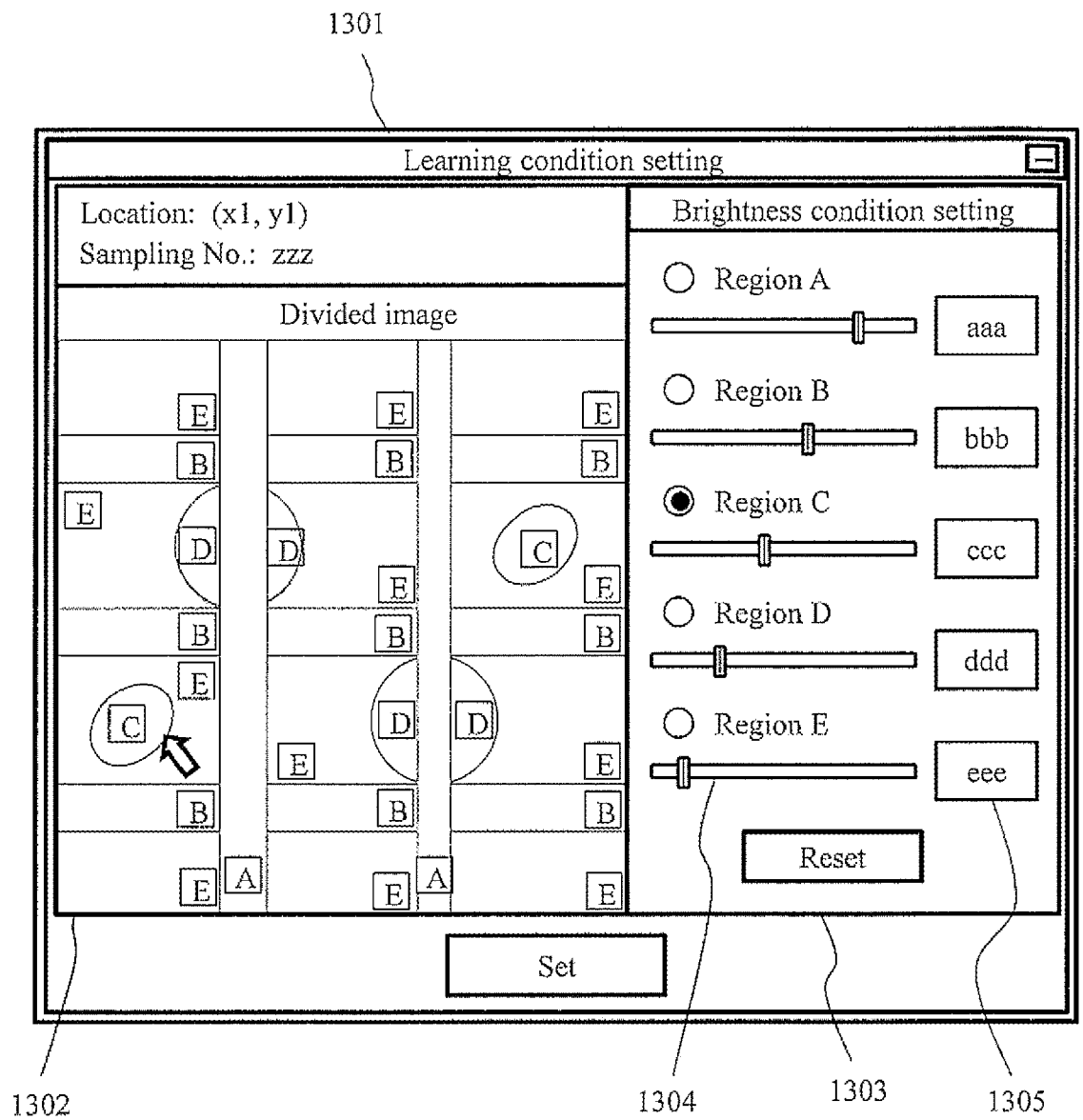

[FIG. 14]
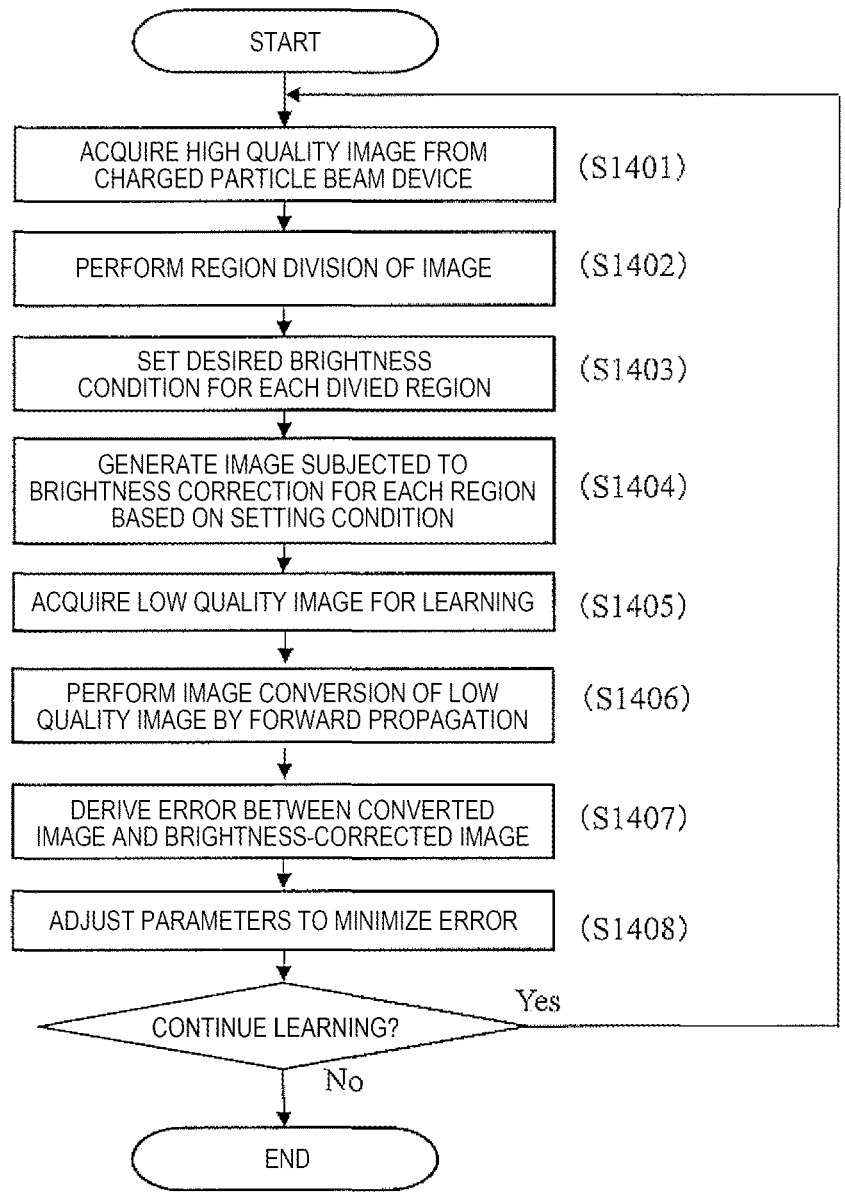

SYSTEM FOR GENERATING IMAGE, AND NON-TRANSITORY COMPUTER-READABLE MEDIUM

TECHNICAL FIELD

The present disclosure relates to a method, a system and a non-transitory computer-readable medium for generating an image, and more particularly, to a method, a system, and a non-transitory computer-readable medium for generating an image on the basis of beam irradiation on a sample.

BACKGROUND ART

PTL 1 discloses a sample observation device that generates an image based on a detection signal obtained based on irradiation of a sample with a charged particle beam. PTL 1 discloses a sample observation device that generates a high quality image from a low quality image using a neural network such as deep learning, and the sample observation device includes an image conversion model for generating the high quality image from the low quality image.

CITATION LIST

Patent Literature

PTL 1: JP-A-2018-137275

SUMMARY OF INVENTION

Technical Problem

However, the neural network, two images, that is, an image converted from the low quality image and the high quality image are used as training data, and learning is performed so as to match both images. Therefore, it may be not possible to sufficiently improve the quality of a specific portion such as an edge of an object to be measured or inspected. Further, when learning is performed so as to match the entire images, a large amount of time may be required for model generation.

Solution to Problem

A method, a system, and a non-transitory computer-readable medium for performing efficient learning of a specific portion will be described below. One aspect for achieving the above purpose proposes a system or a non-transitory computer-readable medium configured to generate a converted image on the basis of input of an input image. The system includes one or more computer subsystems and one or more components configured to be executed by the one or more computer subsystems. The one or more components include a learning model in which parameters are adjusted so as to suppress an error between a first image input as training data during learning and a second image converted upon input of the input image to the system. The learning model is subjected to different learning at least between a first region in an image and a second region different from the first region.

Advantageous Effect

According to the above configuration, it is possible to perform efficient learning of a specific portion.

BRIEF DESCRIPTION OF DRAWINGS

FIG. 1 is a diagram showing an example of a scanning electron microscope (SEM) which is a kind of image generation tool for generating an image input to an image generation system according to a first embodiment.

FIG. 2 is a diagram showing an example of the image generation system that generates a converted image based on image data obtained by the image generation tool as shown in FIG. 1.

FIG. 3 shows an example of a configuration of a neural network.

FIG. 5 is a diagram showing an example of a GUI screen that enables to set image division conditions and weights of loss functions (error adjustment conditions) for divided regions.

FIG. 6 is a diagram showing an example of an image obtained by performing region division using the brightness distribution information.

FIG. 7 is a flowchart showing setting of a learning condition of a learner using the system according to the first embodiment (FIG. 2), learning based on the set learning condition, and an image generation process using the learner subjected to learning.

FIG. 9 shows a scanning electron microscope according to a modification of the first embodiment.

FIG. 10 is a flowchart illustrating an operation of the modification of the first embodiment.

FIG. 11 is a block diagram showing an example of an image generation system according to a second embodiment.

FIG. 12 is a diagram showing an example of a high quality image input to a computer system 202 shown in FIG. 11, a region-divided image obtained by dividing the high-quality image by an image division processing unit 2060, and a brightness-adjusted image obtained by performing brightness adjustment on each of the divided regions of the region-divided image by a region-by-region brightness correction unit 2070.

FIG. 13 shows an example of a GUI screen for setting a brightness correction condition in the second embodiment.

FIG. 14 is a flowchart illustrating an operation according to the second embodiment.

DESCRIPTION OF EMBODIMENTS

Figure 4A:
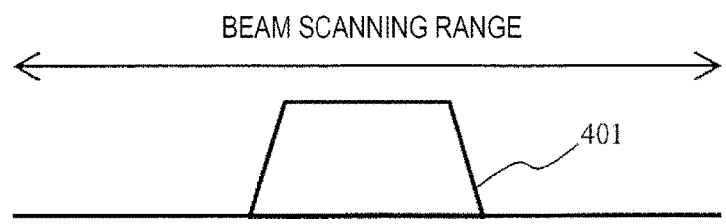
FIGS. 4A to 4C are diagrams showing an example of a pattern to be scanned with a charged particle beam, an image obtained by scanning the pattern with a beam, and a signal waveform formed on the basis of brightness distribution information of the image.

Hereinafter, embodiments will be described with reference to accompanying drawings. In the accompanying drawings, functionally the same elements may be displayed with the same or corresponding numbers. Although the accompanying drawings show the embodiments and implementation examples in accordance with principles of the present disclosure, the accompanying drawings are for the understanding of the present disclosure and are not intended to limit interpretation of the present disclosure. Descriptions in this specification are merely exemplary, and are not intended to limit the scope of the claims or application of the present disclosure in any sense.

It is necessary to understand that the embodiments are described in sufficient detail for those skilled in the art to perform the present disclosure, but other implementations and aspects are possible, and the configuration and the structure can be changed and various elements can be replaced without departing from the scope and the spirit of the technical idea of the present disclosure. Therefore, the following description should not be construed as being limited to the embodiments.

The embodiments described below relate to a method and a system for converting a first image into a second image having an image quality different from that of the first image, and a computer-readable medium, and a method and a system for performing different conversion on a plurality of regions included in an image, and a computer-readable medium will be described.

First Embodiment

An image generation system according to a first embodiment will be described with reference to FIGS. 1 to 10.

FIG. 1 is a diagram showing an example of a scanning electron microscope (SEM) which is a kind of image generation tool for generating an image input to the image generation system according to the first embodiment. In the following description, the image generation tool will be described with the SEM, which is a kind of a charged particle beam device, as an example, but is not limited thereto. For example, a focused ion beam device that generates an image on the basis of scanning with an ion beam can also be used as the image generation tool. Further, it is also possible to use an image generation tool that can simplify the process by generating a low quality image rather than generating a high quality image.

A scanning electron microscope system 100 shown in FIG. 1 includes an imaging unit 101, a computer system 102, a signal processing unit 103, an input and output unit 104, and a storage unit 105. The storage unit 105 also functions as a non-transitory recording medium for storing a computer program that controls an operation of the system. The computer system 102 controls the optical system provided in the imaging unit 101, which will be described below.

The imaging unit 101 includes an electron gun 106 that emits an electron beam 107, a focusing lens 108 that focuses the electron beam 107, and a focusing lens 109 that further focuses the electron beam 107 passed through the focusing lens 108. The imaging unit 101 further includes a deflector 110 that deflects the electron beam 107, and an objective lens 111 that controls a height at which the electron beam 107 is focused.

The electron beam 107 passed through the optical system of the imaging unit 101 is emitted to a sample 112 placed on a sample stage 113. Emitted electrons 114 such as secondary electrons (SE) and backscattered electrons (BSE) emitted from the sample 112 by the irradiation with the electron beam 107 are detected by a lower detector 115 and an upper detector 116 installed in a trajectory thereof. An opening provided in the upper detector 116 allows the electron beam 107 to pass through. By making the opening sufficiently small, it is possible to detect secondary electrons which are emitted from a bottom of a deep hole or a deep groove formed in the sample 112, pass through the vicinity of the center of a pattern, and escape onto a sample surface. The emitted electrons 114 can be distinguished in energy by energy filtering using an energy filter 117a immediately before the upper detector 116 or an energy filter 117b immediately before the lower detector 115.

The imaging unit 101 further includes a blanking deflector 118 that deflects the electron beam 107 to an outside of an optic axis to limit the electron beam 107 from reaching the sample 112, and a blanking electrode 119 that receives the electron beam 107 deflected by the blanking deflector 118.

The signal processing unit 103 generates SEM images on the basis of output of the lower detector 115 and the upper detector 116. The signal processing unit 103 generates image data by storing detection signals in a frame memory or the like in synchronization with scanning by a scanning deflector (not shown). When the detection signal is to be stored in the frame memory, a signal profile (one-dimensional information) and the SEM images (two-dimensional information) are generated by storing the detection signal at a position corresponding to a scanning position of the frame memory. By deflecting the secondary electrons with the deflector 120 as necessary, the secondary electrons that escape from the deep hole or the like and are to pass near the optic axis can be guided out of the opening of the lower detector 115 (to a detection surface of the lower detector 115).

FIG. 2 is a diagram showing an example of the image generation system that generates a converted image on the basis of the image data obtained by the image generation tool as shown in FIG. 1. The computer system 102 shown in FIG. 2 includes one or more computer subsystems each including one or more CPUs and/or GPUs. The computer system 102 shown in FIG. 2 includes one or more components executed by the one or more computer subsystems. The one or more computer subsystems can use one or more processors to implement the processing described below by software, or may implement the processing partially or entirely by hardware such as an electronic circuit.

As an example, the computer system 202 shown in FIG. 2 includes an image conversion unit 2030, a conversion error calculation unit 2040, a conversion parameter update unit 2050, and an image division processing unit 2060. The computer system 202 is configured to receive input of various information from the input device 203.

The image conversion unit 2030 uses an output image of the image generation tool as shown in FIG. 1 or an image stored in a storage medium 201 (low quality image) as an input image, and generates a converted image on the basis of the input image. The image conversion unit 2030 includes a learning model in which conversion parameters are adjusted, and performs image conversion using the learning model. The conversion parameters are appropriately updated by the conversion parameter update unit 2050 and supplied to the image conversion unit 2030. The learning model includes, for example, a neural network, and includes one or more input layers, one or more intermediate layers (hidden layers), and one or more output layers as shown in FIG. 3.

The neural network can perform appropriate output by performing learning for adjusting parameters (weights, biases, and the like) such that a desired result (for example, a high quality image, a correct measurement value, and the like) is obtained in the output layer. Learning is performed by sequentially updating variables (weights and biases) by, for example, an error back propagation algorithm (back propagation), and an output error of data is partially differentiated by the weights (including an activation function) to gradually adjust the output to an optimum value.

The conversion error calculation unit 2040 calculates an error between the converted image (the second image that is an output of the output layer) generated from the low quality image by the image conversion unit 2030 and the image (the first image) input as correct answer data (the high quality image (training data)). More specifically, the conversion error calculation unit 2040 calculates, as a conversion error, an average absolute error, an average square error, or the like calculated on the basis of pixel values of the converted image derived by forward propagation and pixel values of the corresponding correct answer image. The conversion parameter update unit 2050 adjusts the conversion parameters (variables) of the neural network so as to suppress the conversion error of each pixel on the basis of the conversion error, and supplies the conversion parameters (variables) to the image conversion unit 2030.

The image division processing unit 2060 divides the high quality image serving as training data into a plurality of images, and supplies region information related to the division to the conversion error calculation unit 2040. The region information and weight information can be input from the input device 203.

By repeating the forward propagation and the back propagation as described above, the accuracy of the output can be improved, but learning using multiple images (training data) is required until a weight for an input of a neuron is optimized. On the other hand, since measurement or inspection of the pattern or the like of a semiconductor device is performed by a dimension measurement between edges of the pattern or the like or a shape evaluation of the pattern or the like included in the image, for example, high accuracy is not required for a portion other than the edges.

The present embodiment will describe a learning model capable of selectively converting a partial image such as a specific pattern included in an image or edges of a structure other than the specific pattern with high accuracy and a system for subjecting the learning model to learning. When a degree of learning can be changed according to a degree of importance of each portion of the image instead of the entire image, an important portion can be subjected to advance learning to generate a high-quality image, and an unimportant portion can be reduced in processing required for learning to realize efficient learning.

In the system shown in FIG. 2, the image division processing unit 2060 performs image division on the high quality image input as training data, and the image conversion unit 2030 subjects a learner to learning according to a degree of learning for each divided region input by the input device 203. The setting of the degree of learning for each divided region is implemented, for example, by assigning a different weight for each divided region to loss functions which are functions for calculating an error between the correct answer data (label) and the output of the learner. For example, a loss function LD can be calculated on the basis of an equation such as [Equation 1].

$$L_D = (\lambda_1 \cdot L_{bg} + \lambda_2 \cdot L_{edge})$$ [Equation 1]

Here, $L_{bg}$ is a loss function set in a first region (for example, a background portion other than edges of the pattern) in an image, and $L_{edge}$ is a loss function set in a second region (for example, edges of the pattern) in the image. $\lambda_1$ and $\lambda_2$ are weight coefficients of the respective loss functions. For example, by setting the coefficient $\lambda_2$ of the edge portion to be larger than $\lambda_1$, an error value is estimated to be larger than that of a region other than the edge portion, and as a result, it is possible to update the conversion parameters such that the conversion error is suppressed by focusing on the edge portion. The same effect can be obtained by using $L_{bg}$ as a loss function set for the entire image including the edge portion and $L_{edge}$ as a loss function set only for the edge portion, and setting $\lambda_1$ and $\lambda_2$ such that the error value of the edge portion is reflected more than a ratio of the actual total number of pixels of the edges to the total number of pixels of the image.

On the other hand, by setting $\lambda_1 < \lambda_2$ ($\lambda_1$ includes zero), learning is performed at a relatively low degree or not performed for a portion other than the edges which is not required for the measurement or inspection, which enables reduction of the processing required for learning. That is, according to the first embodiment, the learning model subjects each different region in the image to different learning. By relatively increasing the weight of the loss function in the region required for the measurement or inspection in the image and reducing the weight of the loss function in the other region, it is possible to improve reproducibility of the required portion.

Figure 4B:
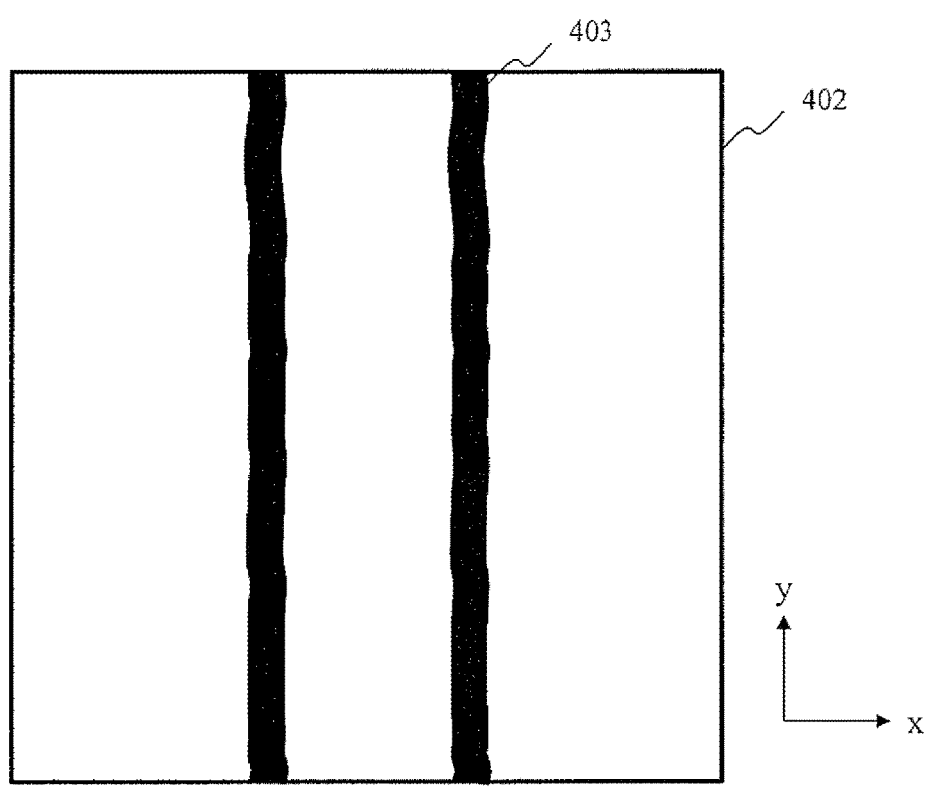
Figure 4C:
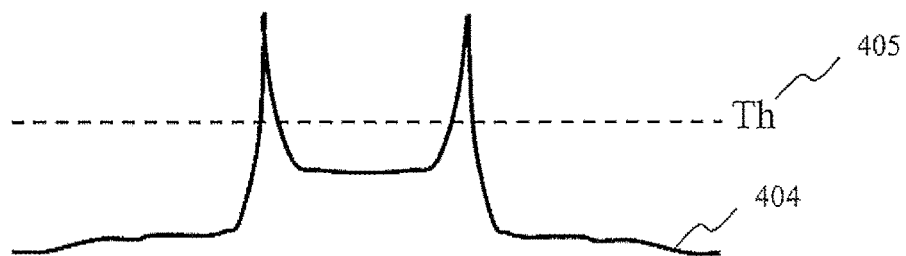

Next, an outline of region division processing in the image division processing unit 2060 shown in FIG. 2 will be described. FIG. 4 is a diagram showing an example of a pattern to be scanned with a charged particle beam, an image obtained by scanning the pattern with a beam, and a signal waveform formed on the basis of brightness distribution information of the image.

A two-dimensional image 402 as shown in (b) of FIG. 4 can be formed by two-dimensionally scanning a line pattern 401 having a cross-sectional shape as shown in (a) of FIG. 4 with the charged particle beam and detecting charged particles obtained by the scanning. Further, by performing projection processing (averaging the signals of the respective pixel columns), a signal waveform (profile) 404 as shown in (c) of FIG. 4 can be generated.

When a pattern having a cross section as shown in (a) of FIG. 4 is scanned with a beam, an amount of charged particles emitted from a location 403 corresponding to the edges of the pattern is larger than an amount of charged particles emitted from the other region due to an edge effect. As described above, in the measurement or inspection using an image, brightness information of the edge portion is important. Therefore, as shown in (c) of FIG. 4, a threshold Th (405) can be set such that a coefficient for a conversion error of a region obtained from a region in which the brightness exceeds the predetermined threshold or a region obtained by giving a margin of several pixels to a region exceeding the threshold is $\lambda_2$, and a coefficient for the conversion error obtained from the other region is $\lambda_1$. Accordingly, it is possible to generate a learning model excellent in reproducibility of the edge portion.

When the measurement is performed on the basis of specification of the edge portion of the pattern, it is desirable to extract, as the edge region, not only a region extracted as a region having a brightness equal to or higher than the predetermined threshold value but also a region including the periphery thereof. In particular, when a dimension between the edges is measured, a reference position for measurement is determined using brightness distribution information of a white band (a high-brightness region corresponding to the edges), and thus a brightness value around the white band also influences a measurement value. Therefore, the training data is desirably image data obtained by extracting an automatically extracted white band region together with a region (peripheral region) corresponding to a specific number of pixels surrounding the white band region. A specific method for extracting image data including the peripheral region will be described later with reference to FIG. 6.

FIG. 5 is a diagram showing an example of a GUI screen that enables to set image division conditions and weights of the loss functions (error adjustment conditions) for divided regions. FIG. 5 shows a GUI for setting a weighting coefficient λ for each divided region, but is not limited thereto, and may allow input of other parameters that can adjust a load of processing required for learning.

The GUI screen shown in FIG. 5 can be displayed, for example, on a display device of the input device 203 shown in FIG. 1. Such a GUI screen allows the computer system 202 (computer subsystem) to set a back propagation condition (learning condition). The GUI screen 501 shown in FIG. 5 includes an SEM image display region 502 and a loss function condition setting region 503.

In the loss function condition setting region 503, the image division condition can be selected. Specifically, the loss function condition setting region 503 is provided with selection buttons including Region of Interest (ROI) Setting to be selected when a desired region is to be set on the GUI, Auto Segmentation to be selected when the region division is to be automatically performed, and Area division by brightness to be selected when the region division is to be automatically performed according to the brightness.

For example, when ROI setting is selected, an ROI setting frame 505 that can be set in any size at any location by a pointer 504 is displayed in the SEM image display region 502. After the location and the size of the ROI are set by the pointer 504, a degree of learning load for the ROI can be set by setting desired weight coefficients ($\lambda_1$, $\lambda_2$) in a weight coefficient setting frame 506. For a region not set as the ROI, a weight coefficient other than the selected region can be selected by setting a weight coefficient ($\lambda_g$) of Background. As described above, the reproducibility and quality of the image in the ROI can be improved by setting the weight coefficients ($\lambda_1$, $\lambda_2$) of the region selected as the ROI to be relatively higher than the weight coefficient ($\lambda_g$) of the region not selected as the ROI.

When Auto Segmentation is selected, the computer system 202 automatically performs region division by, for example, semantic segmentation.

Further, when Area division by brightness is selected, the computer system 202 performs region division according to the brightness information in the image. Specifically, the region division is performed in the image by n-value conversion (n≥2) processing according to the brightness. By providing a weight coefficient setting field 507 for setting the weight coefficient of the loss function for each region divided by the selection of Auto Segmentation or Area division by brightness, it is possible to set an appropriate weight for each region.

The present embodiment has described an example in which an image is divided and loss function conditions are defined according to the degrees of importance of the divided regions, but is not limited thereto. For example, it is possible to selectively learn only the ROI and not to learn the other region. That is, a setting is possible such that information related to the division (region information and the like) is not input from the input device 203 in FIG. 1 and the division processing is not performed in the image division processing unit 2060. Such selective learning may be performed when a portion other than the ROI may be a low quality image and only the edge portion used for the measurement or inspection is desired to be a high quality image.

On the other hand, by allowing to set a degree of processing required for learning for each region as in the present embodiment, it is possible to set an appropriate learning condition according to the purpose in consideration of the reproducibility of the image, the processing time required for learning, and the like. Furthermore, attempting to optimize a region other than the ROI may be a factor that hinders the improvement of the quality of a reproduced image in the ROI, but by enabling learning that improves the quality of the image in the ROI, it is possible to improve the quality of the reproduced image at an early stage. It is also possible to apply another division processing method such as K-means method instead of semantic segmentation.

FIG. 2 shows a system that outputs a high quality image by inputting a low quality image. Here, the low quality image is, for example, a low-frame image (one frame is, for example, one two-dimensional scan). In the scanning electron microscope or the like, in order to improve image quality, it is possible to improve an S/N ratio of an image by scanning the same field of view (FOV) a plurality of times and integrating (averaging) the obtained detection signals. On the other hand, scanning the image with the beam a plurality of times may cause charge accumulation, pattern shrinkage, and the like. In the present embodiment, a high quality image is reproduced from a low quality image by using as one-frame image as the low quality image and using a high-frame image such as a 64-frame image as the high quality image serving as training data.

When the high-frame image is scanned with the beam, the pattern may shrink. Therefore, in the present embodiment, for example, the 64-frame image is scanned with the beam, image signals necessary for generating the high-quality image are acquired, and thereafter, the low-frame-rate image (for example, one-frame image) is acquired. The low-frame-rate image is converted by the image conversion unit 2030 into the converted image, and the high quality image such as the previously acquired 64-frame image is used as training data to calculate the conversion error therebetween. Accordingly, it is possible to subject the learner to learning while suppressing the influence of shrink and the like.

Since an amount of the pattern shrinkage is large in an initial stage of beam scanning, for example, acquisition of signals for generating the high-frame image may be started from a point of time when the shrinkage is settled to some extent (for example, when scanning of an n-frame image is ended from the start of scanning), and the high quality image may be generated on the basis of the obtained detection signals.

FIG. 6 is a diagram showing an example of an image obtained by performing region division using the brightness distribution information. When the brightness distribution information is extracted by projection or the like from the image as shown in FIG. 6, the signal waveform as shown in (c) of FIG. 4 can be generated. Here, a predetermined region based on a center in an x direction of the region in which the brightness exceeds the predetermined threshold, or a region extended by n pixels (n is any natural number) from an end portion in the x direction of the region in which the brightness exceeds the predetermined threshold is set as an ROI 601, and a loss function condition (weight coefficient or the like) specific to the portion can be set, which improves the quality of not only a high-brightness portion but also the region that can be expressed as a peak waveform.

FIG. 7 is a flowchart showing setting of the learning condition of the learner using the system according to the first embodiment (FIG. 2), learning based on the set learning condition, and an image generation process using the learner subjected to learning.

First, the computer system 202 acquires the output image of the image generation tool as shown in FIG. 1 or the image stored in the storage medium 201 (step S701). On the other hand, the image division processing unit 2060 performs region division processing for the image according to region information designated by the input device 203 or the like (step S702). The image division processing unit 2060 performs image division on the basis of the image division condition set on the GUI screen illustrated in FIG. 5, for example.

Next, a learning condition for each region is set by setting the weight coefficient of the loss function, which is one of the parameters of the load required for learning, for each divided region from the GUI screen shown in FIG. 5 (step S703).

Next, by inputting the low quality image into the computer system 202 including the learner, the image conversion unit 2030 generates the converted image (forward propagation). Further, the conversion error calculation unit 2040 obtains a difference in each pixel between the high quality image input to the computer system 202 separately from the low quality image and the converted image, and calculates an error between the image generated by the forward propagation and the high quality image as the correct answer image. Here, the conversion parameter update unit 2050 performs the back propagation using the weighting coefficients assigned to each image region and the loss function in each region, calculates a change in the weights and biases of the neural network, and updates the values thereof (step S704).

Learning is performed by repeating the above forward propagation and back propagation one or more times. It is also possible to apply evolutionary algorithm as a feedback method.

As described above, since the learning model is selectively subjected to advanced learning for a specific region, it is possible to perform estimation (image conversion, step S705) with good reproducibility while suppressing the time and effort required for learning.

Next, an example will be described in which learning is performed according to the degree of importance or the like of each region by setting a different weight coefficient for each location having a different relative positional relationship with an alignment pattern.

Figure 8A:
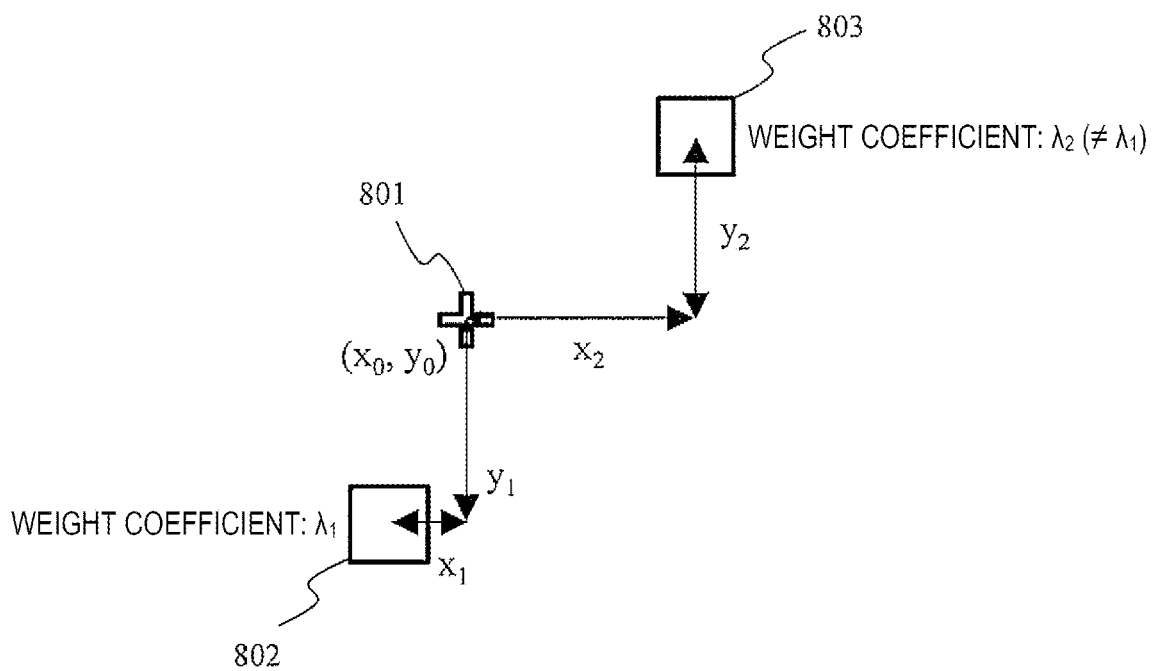
FIGS. 8A and 8B are conceptual diagrams illustrating an example in which learning is performed according to a degree of importance or the like of each region by setting a different weight coefficient for each location having a different relative positional relationship with an alignment pattern, and an example in which a weight coefficient $\lambda_3$ of an ROI 805 in a field of view 804 and a weight coefficient $\lambda_4$ of a region 806 other than the ROI 805 are set in advance in a guide.
Figure 8B:
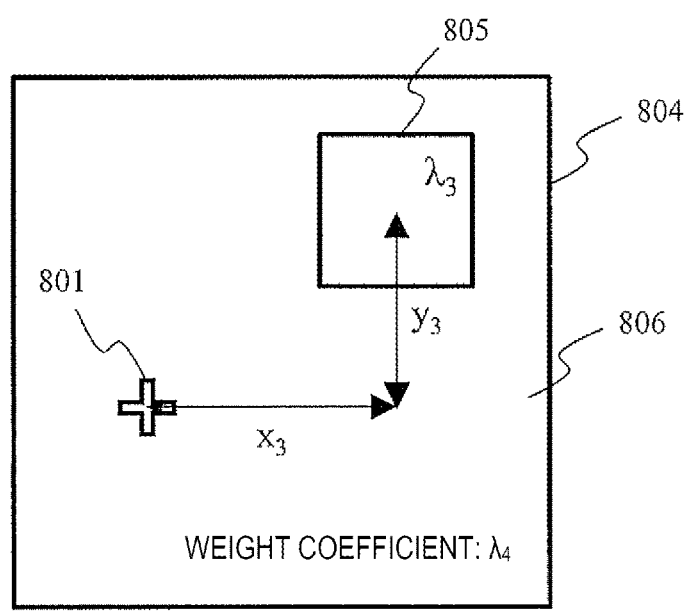

(a) of FIG. 8 is a diagram showing a positional relationship between an alignment pattern 801 formed on a sample such as a semiconductor wafer, a first field of view 802, and a second field of view 803. When a field of view is positioned at a desired location by the scanning electron microscope or the like as shown in FIG. 1, for example, a low magnification image is generated by moving a stage provided in the scanning electron microscope such that the field of view is positioned at, for example, the alignment pattern 801 or coordinates of the desired location, and scanning over a wider range than the field of views at the desired locations with the beam. After the low magnification image is acquired, pattern matching is performed using a template image including a pre-registered alignment pattern 801 to specify a location of the alignment pattern 801, and the field of view is moved to the first field of view 802 and the second field of view 803, which have a known positional relationship with the alignment pattern 801.

The scanning electron microscope shown in FIG. 1 is controlled by an operation program called a guide, and is controlled by one or more computer systems so as to move the field of view on the basis of distance information ($(-x_1, -y_1)$, $(x_2, y_2)$) between the pre-registered alignment pattern 801 and the desired location of the field of view. As shown in (a) of FIG. 8, it is possible to improve learning efficiency by defining the weighting coefficients ($\lambda_1$, $\lambda_2$) of the loss function according to the degree of importance at each location of the field of view.

Further, as shown in (b) of FIG. 8, a weight coefficient $\lambda_3$ of an ROI 805 in a field of view 804 and a weight coefficient $\lambda_4$ of a region 806 other than the ROI 805 may be set in advance in the guide.

FIGS. 9 and 10 show a modification of the first embodiment.

FIG. 9 is a diagram showing an example of the scanning electron microscope including BSE detectors 901 and 902 and an SE detector 908 according to the modification of the first embodiment. A configuration other than that shown in FIG. 9 can be the same configuration as that of the first embodiment (FIG. 1). In the example of FIG. 9, a negative voltage is applied to the sample 112 in order to achieve both high speed of an electron beam passing through the objective lens 111 and low acceleration of the electron beam reaching the sample 112. By applying the negative voltage to the sample 112, a deceleration electric field for decelerating the beam reaching the sample 112 is formed between the sample 112 and the objective lens 111. In such an optical system, secondary electrons 907 emitted from the sample 112 are accelerated substantially along a beam optic axis 904, and deflected toward the SE detector 908 by, for example, a Wien filter 906.

On the other hand, backscattered electrons 903, which are highly accelerated with respect to the secondary electrons 907, are relatively not influenced by the deceleration electric field, and are detected by the BSE detectors 901 and 902 arranged closer to the sample 112 than the SE detector 908. For example, when the backscattered electrons 903 collide with a sidewall of the pattern, the backscattered electrons 903 are reflected in a direction inclined with respect to a surface of the sample 112, and are detected by the BSE detectors 901 and 902 under a focusing action of the objective lens 111. Since the backscattered electrons reflected by the edge portion of the pattern or the like can be selectively detected with the BSE detectors 901 and 902 disposed at the locations shown in FIG. 9, a contrast between the edge portion and the other portions can be clarified.

In the modification of the first embodiment, the region division of the image is performed using such a phenomenon, and a learning process of a learner is executed using brightness distribution information of a BSE image. FIG. 10 is a flowchart showing the learning process of a learner that performs learning using both the BSE image and an SE image.

First, the BSE image and the SE image are acquired on the basis of the detection signals of the SE detector 908 and the BSE detectors 901 and 902 by the scanning electron microscope having the optical system as shown in FIG. 9 (steps S1001 and S1002).

Next, the image division processing unit 2060 shown in FIG. 2 performs image division processing using the brightness distribution information of the BSE image (step S1003). As described above, the backscattered electrons reflected by the edges of the pattern and the like are detected by the BSE detectors 901 and 902, while the backscattered electrons emitted in other directions are not detected. Therefore, in the BSE image, the contrast between the edge portion and the other portions is clarified. Therefore, in the image division processing unit 2060, for example, a high-brightness portion of the BSE image having a brightness equal to or higher than the predetermined threshold is extracted, and the high-brightness portion or a portion obtained by expanding the high-brightness portion by several pixels is set as the ROI. The other portions are defined as the background.

The computer system 202 sets information on the loss function (weight coefficients in the case of the present embodiment) input from, for example, the GUI screen as shown in FIG. 5 as loss function information corresponding to each divided region (step S1004), and stores the information in, for example, the storage unit 105. When the image is divided into two regions of the ROI and the background as described above, the weighting coefficients $\lambda_1$ and $\lambda_g$ are set.

The computer system 202 performs learning of the learner by performing different learning (repeating the forward propagation and the back propagation one or more times) for each region using the weight coefficients set for each region as described above (step S1005). According to a method shown in FIG. 10, efficient learning can be performed.

Second Embodiment

Next, an image generation system according to a second embodiment will be described with reference to FIGS. 11 to 14. FIG. 11 is a block diagram showing an example of the image generation system according to the second embodiment. The same components as those according to the first embodiment (FIG. 2) are denoted by the same reference numerals in FIG. 11, and thus a repetitive description thereof will be omitted below.

The system shown in FIG. 11 is a system that is capable of generating an image having a better appearance, instead of simply generating a high quality image. Specifically, the system in FIG. 11 includes a region-by-region brightness correction unit 2070 in addition to the components of the system in FIG. 2. The region-by-region brightness correction unit 2070 is configured to perform brightness correction processing for each of the images divided by the image division processing unit 2060. That is, the region-by-region brightness correction unit 2070 is configured to correct the brightness value such that each divided region has a predetermined brightness.

FIG. 12 is a diagram showing an example of a high quality image input to the computer system 202 shown in FIG. 11, a region-divided image obtained by dividing the high-quality image by the image division processing unit 2060, and a brightness-adjusted image obtained by performing brightness adjustment on each of the divided regions of the region-divided image by the region-by-region brightness correction unit 2070. A high quality image 1201 shown in FIG. 12 is an image obtained by imaging the semiconductor device as an example, and includes an upper layer wiring 1202, a lower layer wiring 1203, a circular structure 1204, and a circular structure 1205 overlayed on the wirings or the like.

The image division processing unit 2060 generates the region division image by performing region division according to, for example, semantic segmentation or brightness. When the region division is performed according to the brightness, for example, it is conceivable to perform processing of dividing an image into predetermined luminance ranges. For example, an upper layer pattern 1202 included in the high quality image 1201 is often brighter than a lower layer pattern 1203. This is because secondary electrons closer to a surface of the sample can be emitted more easily and have a larger detection amount of the secondary electrons. Further, a shape of the pattern, a positional relationship with other structures, and the like may be converted into features, and classification may be performed according to the features. The example of FIG. 12 shows an example in which an image is divided into five regions A to E. Specifically, in FIG. 12, one image is divided into five regions: (1) a region A corresponding to the upper layer wiring 1202; (2) a region B corresponding to the lower layer wiring 1203; (3) a region C corresponding to the circular structure 1204; (4) a region D corresponding to the circular structure 1205 overlayed on the upper layer wiring 1202; and (5) a region E serving as the background.

The region-by-region brightness correction unit 2070 performs brightness correction on each region divided as described above on the basis of brightness correction information input from the input device 203 or the like. The brightness correction condition may be set, for example, on the GUI screen shown in FIG. 13. A GUI screen 1301 shown in FIG. 13 is configured such that the brightness of each region divided by the computer system 202 can be adjusted.

The GUI screen 1301 is provided with a divided image display region 1302 and a brightness condition setting field 1303. A divided image generated by the image division processing unit 2060 is displayed in the divided image display region 1302. The brightness condition setting field 1303 is provided with a slide bar 1304 for adjusting the brightness of each divided region, a brightness setting field 1305 for setting the brightness numerically, and the like.

The brightness setting field 1305 displays an initial brightness of the divided image, and an operator can use the brightness setting field 1305 or the slide bar 1304 to adjust each region to the desired brightness. By adjusting the display so as to change the brightness of each region of the divided image display region 1302 in accordance with the adjustment of the brightness by the slide bar 1304 or the like, the operator can perform the condition setting while confirming the quality of the converted image.

The second embodiment has mainly described an example in which the brightness of each region is manually adjusted, but for example, a mode in which light and dark are reversed may be provided such that a dark region is brightened and a bright region is darkened, such that the brightness can be automatically adjusted. A mode in which the circular structures have a high brightness and the brightness of other regions is lowered may be prepared, such that the circular structures can be selectively used according to the purpose of the measurement or inspection.

FIG. 14 is a flowchart showing a learning condition setting process and the learning process of the learner in the system shown in FIG. 11. According to the flowchart, it is possible to generate an image in which the brightness of any region included in the image is selectively changed.

In the learning process according to the second embodiment, the computer system 202 shown in FIG. 11 first acquires a high quality image serving as training data and generates the divided image using the image division processing unit 2060 (steps S1401 and S1402). The divided image is displayed on the GUI screen or the like displayed on the display device or the like of the input device 203.

The operator sets an appropriate brightness correction condition while referring to the divided image displayed in the divided image display region 1302 and the brightness on the display device of each divided region (step S1403). The region-by-region brightness correction unit 2070 corrects the brightness of the image under the set brightness correction value condition (step S1404), and sends data of a brightness-corrected image to the conversion error calculation unit 2040 as the correct answer data (label).

On the other hand, the image conversion unit 2030 acquires a low quality image for learning (step S1405) and generates a converted image (step S1406) in order to perform the forward propagation using the low quality image as input. The conversion error calculation unit 2040 obtains an error between the converted image generated through the forward propagation and the brightness-corrected image output from the region-by-region brightness correction unit 2070. The conversion parameter update unit 2050 receives the conversion error serving as training data in each pixel, and sets conversion parameters to minimize loss (steps S1407 and S1408). Learning is performed by repeating the processing of steps S1401 to 1408 one or more times.

According to the computer system 202 shown in FIG. 11, since different learning can be performed on each of the divided regions (for example, wirings and circular structures), it is possible to generate an image according to the preference of the operator from a low quality image.

The above-described embodiment has described an example in which the brightness of each divided region is changed, but for example, it is possible to color a specific pattern with a color other than a gray level by image processing and use the pattern as the training data.

Third Embodiment

Next, an image generation system according to a third embodiment will be described with reference to FIG. 15. The system according to the third embodiment may have the same basic configuration as the configurations according to the above-described embodiments (FIGS. 2 and 11). However, the third embodiment is configured to enable different learning for each region by changing the scanning speed for each region in addition to (or instead of) the configurations of the above-described embodiments.

Figure 15A:
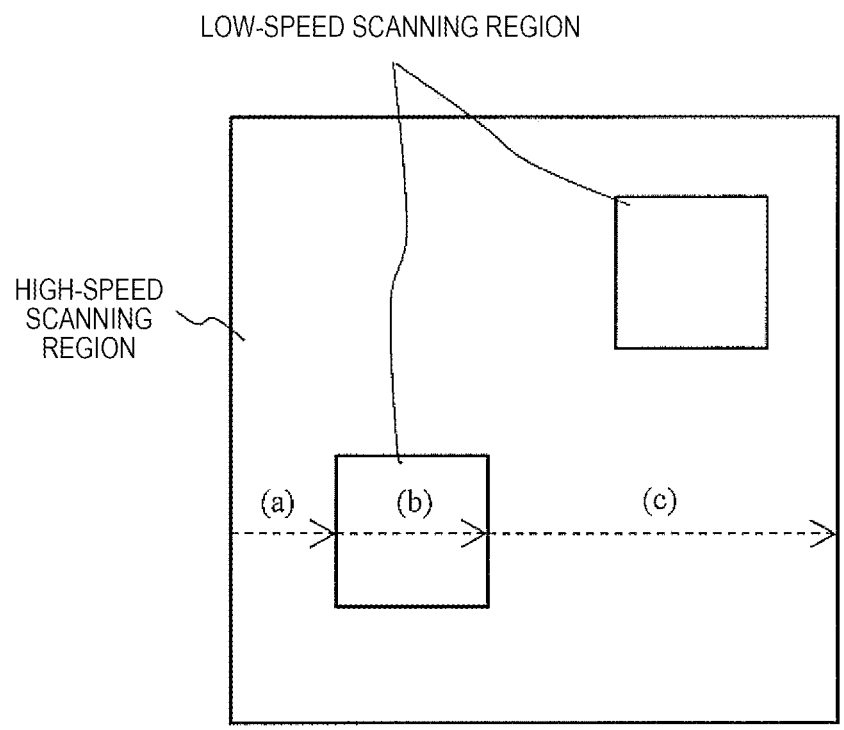
FIGS. 15A and 15B are conceptual diagrams illustrating an operation of a system according to a third embodiment.
Figure 15B:
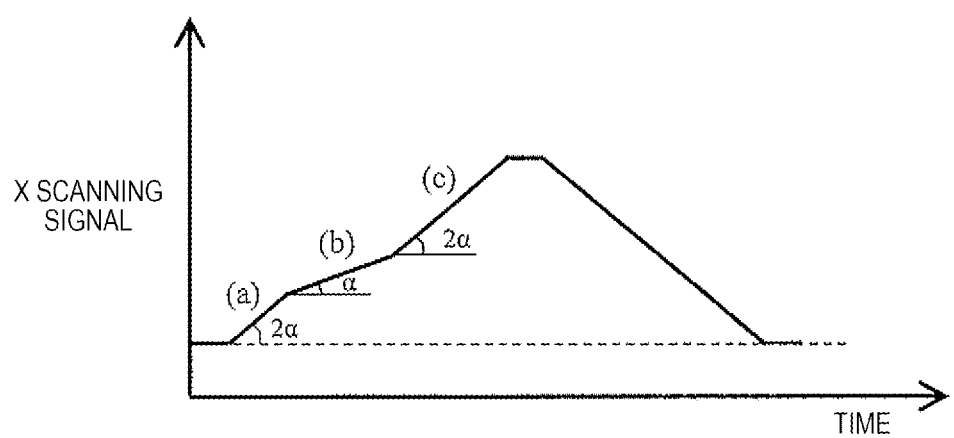

FIG. 15 is a conceptual diagram illustrating features of the third embodiment. (a) of FIG. 15 shows an example in which a low-speed scanning region and a high-speed scanning region are set in one field of view (FOV). Switching between high-speed scanning and low-speed scanning in the FOV can be achieved, for example, by changing scanning signals supplied to the scanning deflector of the electron microscope as shown in (b) of FIG. 15. A slope of the signal waveform indicates a scanning speed, and the example in (b) of FIG. 15 shows that the scanning speed in a region (b) is ½ of the scanning speed in regions (a) and (c). Since a beam irradiation amount per unit area decreases as the scanning speed increases, the influence of electrification or the like can be reduced, and a detection signal amount decreases as the irradiation amount decreases.

In the third embodiment, for example, a region to be a measurement reference or an inspection target can be set as the ROI, and low-speed scanning can be selectively performed in the ROI. Accordingly, acquisition of necessary information and suppression of the influence of electrification or the like in the FOV can both be achieved.

As described above, in the first embodiment (FIG. 2), efficient learning can be performed by selectively learning a portion in the ROI and not learning the other regions or by reducing the weight λ.

In the third embodiment, the low quality image and the high quality image can be generated not only by changing the number of frames but also by changing the scanning speed. The low quality image and the high quality image can also be generated by other methods such as changing the beam irradiation amount per unit area instead of changing the scanning speed.

(Others)

Another example will be described as a method for performing different learning in each region. The secondary electrons generated by scanning the sample with the electron beam have a larger emission amount in the edge portion of the pattern or the like with respect to a flat surface of the sample, and are displayed with a high brightness on the image. Meanwhile, backscattered electrons emitted from the sample are suitable for generating a contrast image corresponding to a material contained in the sample. Furthermore, according to the electron microscope including the optical system as shown in FIG. 9, backscattered electrons traveling in a specific direction can be selectively detected, which enables to generate an image in which the contrast of the edge portion of the structure on the sample is clear.

Another example in which the learning model is generated according to the characteristics of the detected electrons as described above and the purpose of the measurement or inspection will be described below. First, in the case of the learning model that generates an image for measuring a dimension between the edges of the pattern, it is desirable to increase the weight coefficient in the high-brightness region (edge portion) of the SE image. When it is necessary to clarify the material contrast, it is conceivable to increase the weighting coefficient of a portion where the brightness changes significantly (portion where the material changes) in the BSE image. By providing a system that can generate the SE image and the BSE image using an optical system capable of simultaneously detecting secondary electrons and backscattered electrons as shown in FIG. 9 and perform a plurality of types of learning according to purposes, a plurality of models according to the application can be efficiently generated.

In the above-described embodiments, the system including the learner that generates (estimates) the high quality image by image conversion of the low quality image has been described. Instead of the high quality image, learning may be performed using a dimension value between the edges, the profile waveform, a contour line, a roughness evaluation value, and the like obtained from the high quality image as the correct answer data, so as to estimate these values and data. For example, in the case of the dimension value between the edges, the learning is performed by using the dimension value obtained by a measurement algorithm from the high quality image including two or more edges to be measured as the correct answer data, and updating the conversion parameters so as to minimize an error between the dimension value obtained by the forward propagation of the low quality image in the same region as the high quality image and the dimension value of the correct answer data.

It is possible to subject the learner to learning by extracting the correct answer data from the high quality image and performing learning by the back propagation similarly with respect to the other estimation targets.

The invention is not limited to the embodiments described above and includes various modifications. For example, the embodiments described above have been described in detail for easy understanding of the invention, and the invention is not necessarily limited to those including all of the configurations described above. A part of a configuration according to a certain embodiment can be replaced with a configuration according to another embodiment, and a configuration according to a certain embodiment can be added to a configuration according to another embodiment. A part of the configuration of each embodiment may be added to, deleted from, or replaced with another configuration.

REFERENCE SIGN LIST 100 scanning electron microscope system
101 imaging unit (scanning electron microscope)
102 computer system
103 signal processing unit
104 input and output unit
105 storage unit
106 electron gun
107 electron beam
108 focusing lens
109 focusing lens
110 deflector
111 objective lens
112 sample
113 stage
114 emitted electron
115 deflector
116 detection pinhole
117a, 117b energy filter
118 secondary electron
119 detector
120 secondary electron
121 detector
123, 201 storage medium
202 computer system
203 input device
2030 image conversion unit
2040 conversion error calculation unit
2050 conversion parameter update unit
2060 image division processing unit
2070 region-by-region brightness correction unit

The invention claimed is:

1. A semiconductor pattern image generating system configured to generate a converted image on the basis of input of a semiconductor pattern image, the semiconductor pattern image generating system comprising:
one or more computer subsystems; and
one or more components configured to be executed by the one or more computer subsystems, wherein
the semiconductor pattern image is an image obtained by a charged particle beam apparatus irradiating a semiconductor sample with an electron-charged particle beam,
the one or more components include a learning model in which parameters are adjusted so as to suppress an error between a first image input as training data during learning and a second image converted upon input of the input semiconductor pattern image to the semiconductor pattern image generating system,
the learning model is subjected to different learning at least between a first region in an image and a second region different from the first region,
each of the first and second regions is a region identified by pattern matching.

2. The semiconductor pattern image generating system according to claim 1, wherein
the one or more components are configured to divide the first image and subject each of divided regions to different learning.

3. The semiconductor pattern image generating system according to claim 2, wherein
the one or more components are configured to adjust a load required for learning in each of the divided regions.

4. The semiconductor pattern image generating system according to claim 2, wherein
the one or more components are configured to adjust the error in at least one of the divided regions.

5. The semiconductor pattern image generating system according to claim 4, wherein
the one or more components are configured to adjust the error on the basis of input of a coefficient that changes a value of the error in at least one of the divided regions.

6. The semiconductor pattern image generating system according to claim 5, wherein
the one or more components are configured to adjust the error in one of the divided regions and the error in another one of the divided regions, respectively.

7. The semiconductor pattern image generating system according to claim 4, further comprising:
an input device configured to input a condition for adjusting the error in at least one of the divided regions.

8. The semiconductor pattern image generating system according to claim 2, wherein
the one or more components are configured to extract a region included in the first image that has a brightness value equal to or higher than a predetermined value.

9. The semiconductor pattern image generating system according to claim 8, wherein
the one or more components are configured to extract the region having the brightness value equal to or higher than the predetermined value and a region corresponding to a specific number of pixels surrounding the region having the brightness value equal to or higher than the predetermined value.

10. The semiconductor pattern image generating system according to claim 2, further comprising:
an input device configured to input a correction condition for correcting a brightness for each of the divided regions, wherein
the one or more components are configured to correct a brightness in at least one of the divided regions according to the correction condition input from the input device.

11. The semiconductor pattern image generating system according to claim 10, wherein
the one or more components are configured to adjust the parameters so as to suppress an error between the first image corrected by the correction condition and the second image.

12. The semiconductor pattern image generating system according to claim 1, wherein the learning model is trained such that a difference of brightness between the first and second images corresponding to the first and second regions is different between the first and second regions.

13. The semiconductor pattern image generating system according to claim 1,
wherein the first image is a high quality image, and
wherein the semiconductor pattern image is a low quality image.

14. A non-transitory computer-readable medium storing a program instruction executable on a computer system to perform a computer-implemented method for converting an input image, wherein
the computer-implemented method includes a learning model configured to generate a converted image on the basis of input of the input image, in the learning model, parameters are adjusted so as to suppress an error between a first image input as training data during learning and a second image converted upon input of the input image to the learning model, the learning model is subjected to different learning at least between a first region in an image and a second region different from the first region, the input image is a semiconductor pattern image obtained by a charged particle beam apparatus irradiating a semiconductor sample with an electron-charged particle beam, and each of the first and second regions is a region identified by pattern matching.

15. The non-transitory computer-readable medium according to claim 14, wherein the computer-implemented method includes dividing the first image and subjecting each of the divided regions to different learning.

16. The non-transitory computer-readable medium according to claim 15, wherein the computer-implemented method includes adjusting a load required for learning in each of the first region and the second region.

17. The non-transitory computer-readable medium according to claim 15, wherein the computer-implemented method includes using, as the first image, an image in which brightness of at least one of the first region and the second region is changed.

18. A semiconductor pattern image generating system configured to generate a converted image on the basis of input of a semiconductor pattern image, the semiconductor pattern image generating system comprising:

an input device;

one or more computer subsystems; and one or more components configured to be executed by the one or more computer subsystems, wherein the one or more components include a learning model in which parameters are adjusted so as to suppress an error between a first image input as training data during learning and a second image converted upon input of the input image to the image generating system, the learning model is subjected to learning based on a learning condition of at least one of a first region and a second region input from the input device, the input image is a semiconductor pattern image obtained by a charged particle beam apparatus irradiating a semiconductor sample with an electron-charged particle beam, and each of the first and second regions is a region identified by pattern matching.

19. The semiconductor pattern image generating system according to claim 18, wherein the input device is configured to input a learning condition for each of the first region and the second region.

20. The semiconductor pattern image generating system according to claim 18, wherein the input image is an image based on a detection signal of secondary electrons or backscattered electrons.

21. The semiconductor pattern image generating system according to claim 18, wherein the learning model is trained differently between the first region and the second region by changing a scanning speed or irradiation dose of the electron-charged particle beam for each of the first and second regions.

* * * * *